Figure 1:
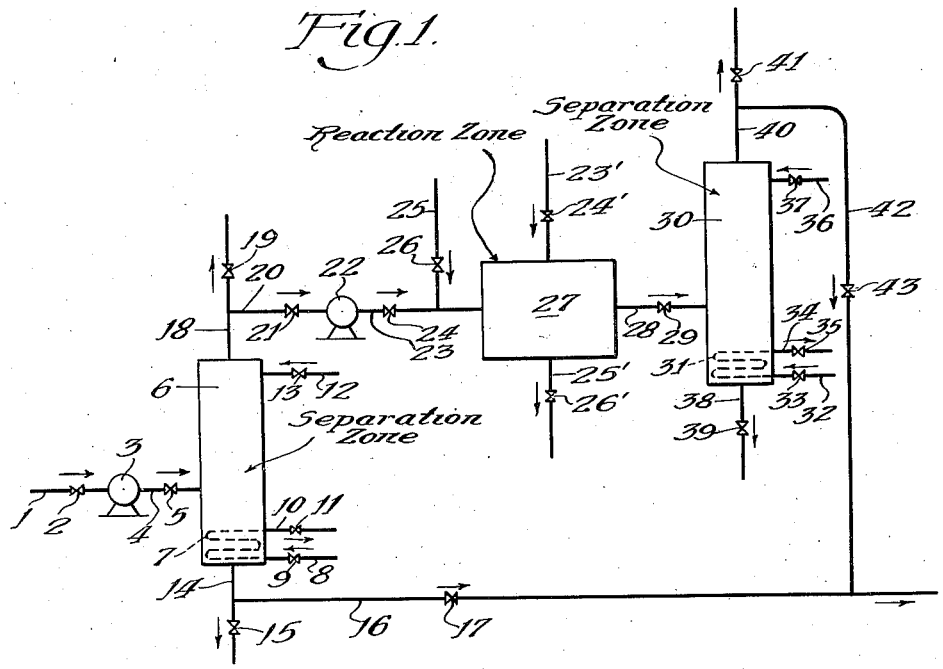
Figure 2:
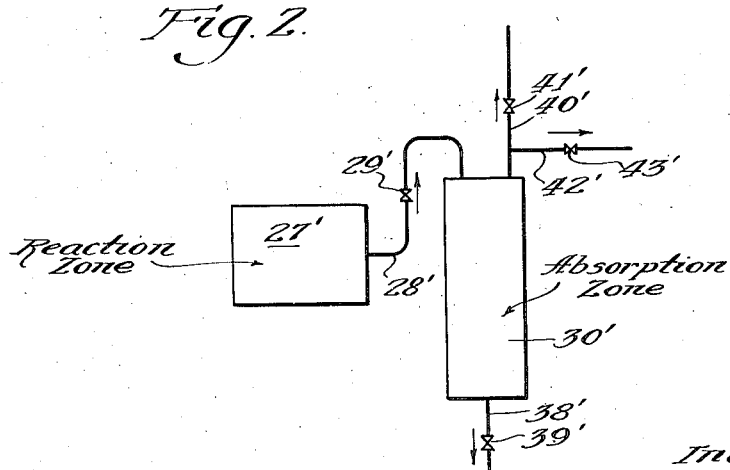

Nov. 20, 1945.    H. PINES ET AL    2,389,457
PURIFICATION OF HYDROGEN HALIDES
Filed Dec. 31, 1943

Inventors:
Herman Pines
Herman S. Bloch
By: Lee J. Gary
Attorney

Patented Nov. 20, 1945

2,389,457

UNITED STATES PATENT OFFICE 2,389,457

PURIFICATION OF HYDROGEN HALIDES

Herman Pines and Herman S. Bloch, Riverside, Ill., assignors to Universal Oil Products Company, Chicago, Ill., a corporation of Delaware Application December 31, 1943, Serial No. 516,434

12 Claims. (Cl. 23—154)

This application is a continuation-in-part of application Serial No. 455,509, filed August 20, 1942, which is a continuation-in-part of application Serial No. 360,906, filed October 12, 1940, now U. S. Patent 2,300,235.

This invention relates to the removal of undesirable impurities in hydrogen halides and is more specifically concerned with the removal of impurities such as carbon monoxide, carbon dioxide, hydrogen sulfide, etc., which may be present in varying amounts as contaminants in commercially prepared hydrogen halides including hydrogen chloride, hydrogen bromide, hydrogen fluoride and hydrogen iodide.

Up to the advent of commercial processes using metal halide catalyst of the Friedel-Crafts type, and particularly aluminum chloride catalyst in conjunction with hydrogen chloride, for such processes as isomerization of saturated hydrocarbons and alkylation of isoparaffinic by olefinic hydrocarbons, there had been little commercial demand for substantially anhydrous hydrogen chloride, and this demand had been met by drying the hydrogen chloride produced in the well-known "salt cake" process in which ordinary sodium chloride was treated with sulphuric acid, generally in two stages, although this process was more commonly used to produce hydrochloric acid. As the demand for anhydrous hydrogen chloride has increased, other processes have been developed in which hydrogen chloride is manufactured by the action of chlorine on water gas mixtures consisting of hydrogen and carbon monoxide. These processes may utilize specific catalysts and light under controlled conditions to facilitate the union of hydrogen and chlorine to produce the desired hydrogen chloride. While some of the mixtures thus obtained are partially purified before sale in order to remove a major portion of the impurities, a considerable amount of the marketed hydrogen chloride still contains up to 10% of impurities of the type heretofore indicated so that when they are used in connection with metal halide catalysts they cause definite deterioration with shortening of the active life of the metal halide.

The present invention is directed to the further purification of the partially purified hydrogen chloride fraction in order to decrease the impurities which, as heretofore set forth, may range up to 10%, to a considerably lower percentage so that the hydrogen chloride fraction may be used in connection with metal halide catalysts without excessive deterioration thereof. Although the total impurities may range up to 10%, the harmful impurities will usually not be over 5%. The harmful impurities are those containing oxygen, sulfur or the like, such as oxygen, carbon monoxide, carbon dioxide, hydrogen sulfide, etc. Hydrogen and nitrogen are usually not harmful to metal halide catalysts and the only objection to their presence is that of a diluent effect.

In a broad aspect the present invention relates to a process for purifying hydrogen halides which comprises separating a gaseous phase and a liquid phase, reacting the gaseous phase with an organic compound in the presence of a metal halide catalyst of the Friedel-Crafts type to convert at least a portion of the impurities and to leave a purified hydrogen halide fraction, and blending the purified hydrogen halide fraction with said liquid phase.

In one specific embodiment the present invention relates to a process for purifying a hydrogen chloride fraction containing up to 10% impurities which comprises partially liquefying said fraction to form a liquid phase and a gaseous phase, the gaseous phase comprising 15% or less of said fraction, reacting the gaseous phase with a saturated hydrocarbon in the presence of an aluminum chloride catalyst to produce oxygenated hydrocarbons and to leave a purified hydrogen chloride fraction, and blending the pure hydrogen chloride fraction with said liquid phase.

In accordance with the present invention an impure hydrogen chloride fraction is treated by a combination of interdependent and mutually related steps to remove harmful contaminants and to thereby produce a hydrogen chloride fraction of high purity.

In the first step of the process a gaseous phase comprising not more than 15% of said hydrogen chloride fraction is separated from a liquid phase. We have found that by removing this comparatively small proportion as a gaseous phase, the residual liquid phase will contain an unexpectedly low percent of contaminants. In some cases satisfactory purification may be accomplished by removing less than 10% and even 5% or less, depending upon the amount and character of the impurities present therein.

In the second step of the process, the thus separated gaseous phase is reacted with an organic compound and particularly with a saturated hydrocarbon in the presence of a metal halide catalyst of the Friedel-Crafts type and particularly aluminum chloride under conditions to react the oxygen-containing impurities with the hydrocarbon. The reaction products of the impurities and hydrocarbon will usually be retained in the aluminum chloride catalyst phase and thus are readily separated from the hydrogen chloride and excess hydrocarbons.

In the third step of the process, separation of excess saturated hydrocarbon from hydrogen chloride may be accomplished by any suitable method such as by fractional distillation in case the saturated hydrocarbon is of sufficiently different boiling range from hydrogen chloride to permit their ready separation, or by selective adsorption of the hydrogen chloride on a suitable adsorbent, followed by desorption of the purified hydrogen chloride.

In the final step of the process, the purified hydrogen chloride, separated either by fractional distillation, selective adsorption, or otherwise is blended with the originally separated liquid phase to thereby produce a final hydrogen chloride fraction of high purity.

The invention will be further explained in connection with the attached diagrammatic flow drawing. Figure I illustrates one specific embodiment of the invention in which the purified gaseous hydrogen chloride fraction is separated by fractional distillation, while Figure II illustrates a similar process in which the separation of the purified gaseous hydrogen chloride fraction is effected by selective adsorption.

Referring to the drawing, an impure hydrogen chloride fraction is introduced to the process through line 1 containing valve 2 to pump, compressor or the like 3, by means of which it is directed through line 4 containing valve 5 into separation zone 6. The extent of liquefaction by means of pump, compressor or the like 3 and the extent of separation in zone 6 will depend upon the amount and character of the impurities present in the charge and the degree of purity desired in the final product. Zone 6 is provided in the lower portion thereof with any suitable heating means, such as internal heating coils 7, through which steam or other suitable heating medium is introduced through line 8 containing valve 9 and is withdrawn therefrom through line 10 containing valve 11. It is understood that heating coils 7 may be omitted when desired, and also that any other suitable form of heating may be employed. When desired, suitable cooling means may be employed in the upper portion of zone 6 and this is illustrated by line 12 containing valve 13, although it is understood that other suitable cooling means may be utilized.

The function of element 3 and zone 6 is to separate a gaseous phase comprising not more than 15% of the impure hydrogen chloride fraction charged to the process. The remaining liquid fraction will now contain an unexpectedly low percentage of contaminants and may be withdrawn from zone 6 through line 14. While a portion thereof may be removed from the process through valve 15, in accordance with the present invention, at least a portion of the liquid phase is directed through line 16 and valve 17 for blending in the manner to be hereinafter described in detail.

The gaseous phase separated in zone 6, which will contain a large proportion of the contaminants, is withdrawn through line 18 and, although a portion thereof may be removed from the process through valve 19, at least a portion thereof is directed through line 20 and valve 21 to pump, compressor or the like 22, by means of which it is directed through line 23 and valve 24. An organic compound and particularly a saturated hydrocarbon is introduced to the process through line 25 and valve 26 into line 23, wherein it is admixed with the gaseous hydrogen chloride phase and then directed into reaction zone 27.

The organic compound introduced through line 25 may be an alcohol, ether etc., but preferably is a saturated hydrocarbon and particularly a paraffinic hydrocarbon. We have found that a saturated hydrocarbon readily reacts with the impurities under the conditions hereinafter specified. Propane, butane, pentanes and hexanes are preferred as the paraffinic hydrocarbon to be employed. Usually an excess of paraffinic hydrocarbon is used in order to insure complete conversion of the impurities.

Reaction zone 27 may be of any suitable apparatus in order to react the impurities and particularly the oxygen containing contaminants with the saturated hydrocarbons. The catalysts employed are metal halides of the Friedel-Crafts type and particularly aluminum chloride, and although a fixed bed of metal halide supported on a carrier may be used, the catalyst in fluid condition is preferably employed and may be introduced continuously or intermittently to zone 27 by way of line 23' containing valve 24'. The temperatures employed in zone 27 are substantially atmospheric, although subatmospheric temperatures as low as −25° C. and super atmospheric temperatures up to about 350° C. may be employed. Although atmospheric pressure may be employed, it is usually preferred to utilize superatmospheric pressure which may range up to 400 pounds or more.

The catalyst and reaction products of the impurities and hydrocarbon will be liquid, semisolid or solid and will be retained in the aluminum chloride catalyst phase when liquid or semi-solid. The catalyst phase containing the aforementioned reaction products may be continuously or intermittently removed from zone 27 through line 25' and valve 26'. The oxygenated hydrocarbons formed in zone 27 may be recovered from the catalyst by hydrolysis or by any other suitable method. The thus recovered oxygenated hydrocarbons are suitable for many uses. The hydrogen chloride and excess saturated hydrocarbon are directed from zone 27 through line 28 and valve 29 into separation zone 30.

In the embodiment of the invention illustrated in Figure I, the excess hydrocarbon is separated from the hydrogen chloride by fractional distillation means and zone 30 may thus comprise any suitable fractionating zone for accomplishing this separation. Zone 30 may be provided with suitable heating means in the lower portion thereof such as heating coil 31, through which steam or other suitable heating medium is introduced through line 32 and valve 33 and withdrawn through line 34 and valve 35. Suitable cooling means may be introduced through line 36 and valve 37 to the upper portion of zone 30. In case the overhead fraction withdrawn from zone 30 is subjected to condensation, a particularly suitable cooling medium for this purpose comprises a portion of the condensate. The excess hydrocarbon is withdrawn from zone 30 through line 38 containing valve 39.

Hydrogen chloride is withdrawn from the upper portion of zone 30 through line 40 and, a portion thereof may be removed from the process through valve 41 but, in accordance with the present invention, at least a portion of the purified hydrogen chloride is directed through line 42 and valve 43 to be blended with the previously separated liquid fraction in line 16.

Figure II of the drawing illustrates a process in which the hydrogen chloride is separated from the excess saturated hydrocarbon by means of selective adsorption. In the interest of simplicity zone 6, communicating lines, compressors, etc., have been omitted since they are the same as illustrated in Figure I. Reaction zone 27' corresponds to reaction zone 27 in Figure I. The hydrogen chloride and excess hydrocarbons are directed through line 28' containing valve 29' into adsorption zone 30'. Although one adsorption column is illustrated in the drawing, it is understood that two or more of such zones may be employed so that the process may be continuous; that is, one column being utilized to adsorb hydrogen chloride, while the hydrogen chloride in the other column is being recovered.

Zone 30 is packed with a suitable granular solid adsorbent such as dry charcoal of either animal or vegetable origin, similar activated chars derived from petroleum coke, activated alumina, silica gel, diatomaceous earth, or any active and porous earth or clay. The adsorbent preferably is calcined to a temperature sufficient to eliminate moisture therefrom. Other suitable adsorbents comprise salts and particularly sulfates of copper, silver, zinc, cadmium, mercury and lead.

The adsorption treatment is usually effected at a temperature of less than 100° C. and under superatmospheric pressures up to 500 pounds or more. When desired, a pump, compressor or the like may be positioned in line 28' in case higher pressures are desired in zone 30 than are utilized in zone 27.

The hydrogen chloride is selectively adsorbed by the adsorbent in zone 30', while the excess hydrocarbons pass therethrough and are removed from 30' through line 38' containing valve 39'.

After the adsorption of hydrogen chloride in one adsorption column has progressed to the desired extent, the flow of products to and from the column is switched to a second adsorption column. The hydrogen chloride may be recovered from the first adsorption column by desorption in any suitable manner. This may comprise raising the temperature, by suitable means not illustrated, and/or reducing the pressure in the adsorption column by means of valve 29' in order to liberate the hydrogen chloride.

The desorption temperature may range from about 40° to about 260° C. or more, and the pressure may be reduced to atmospheric or below, but not generally below 0.1 atmosphere. The desorbed hydrogen chloride may be removed from the upper portion of zone 30' through line 40' and, while a portion thereof may be withdrawn from the process through valve 41', in accordance with the present invention, at least a portion thereof is directed through line 42' and valve 43' to commingle with the previously separated liquid fraction in line 16 as illustrated in Figure I.

It is also within the scope of the invention to remove the hydrogen halide from the adsorbent by stripping with a suitable stripping medium. However, this type of operation is generally not preferred unless there is a special reason for using it. One such reason may be the preparation of a hydrogen chloride-isobutane fraction for use in an alkylation process and, in this case, isobutane may be used to strip the hydrogen chloride from the adsorbent.

The invention is further illustrated in the following example but not with the intention of unduly limiting the broad scope of the invention.

A cylinder of commercial hydrogen chloride at room temperature was of the following composition:

| Mol percent | Gaseous phase | Liquid phase |
| --- | --- | --- |
| Hydrogen chloride | 83.6 | 98.3 |
| Oxygen | 0.5 | 0.09 |
| Hydrogen | 2.2 | 0.09 |
| Nitrogen | 10.7 | 1.11 |
| Carbon monoxide | 3.0 | 0.37 |

A gaseous phase, comprising about 5% of the total hydrogen chloride fraction, was separated and the composition of the remaining gaseous phase and liquid phase were as follows:

| Mol percent | Gaseous phase | Liquid phase |
| --- | --- | --- |
| Hydrogen chloride | 86.2 | 99.2 |
| Oxygen | 0.4 | 0.05 |
| Hydrogen | 1.5 | 0.04 |
| Nitrogen | 9.2 | 0.53 |
| Carbon monoxide | 2.7 | 0.19 |

It is to be noted that when as little as 5% is removed as a gaseous phase, the remaining liquid phase is of a markedly high purity.

The gaseous phase may be reacted with normal butane at a temperature of 100° C. in the presence of an aluminum chloride catalyst. The reaction products may then be subjected to fractional distillation to separate a purified hydrogen chloride fraction which is then blended with the heretofore separated liquid phase to produce a final hydrogen chloride fraction of high purity.

A major feature of the present process is that only a comparatively small amount of the hydrogen chloride fraction need be treated in order to obtain a final product of high purity. The importance of this advantage is readily seen in the reduced size and therefore costs of equipment in the treating and separating steps of the process.

We claim as our invention:

1. A process for purifying an impure hydrogen halide fraction containing a gaseous impurity of the group consisting of carbon oxides and hydrogen sulfide, which comprises partially liquefying said fraction to separate the same into a gaseous phase and a liquid phase, reacting the gaseous phase with an organic compound in the presence of a metal halide catalyst of the Friedel-Crafts type, and recovering from the resulting products a purified hydrogen halide fraction.

2. A process for purifying an impure hydrogen halide fraction containing a gaseous impurity of the group consisting of carbon oxides and hydrogen sulfide, which comprises partially liquefying said fraction to separate the same into a gaseous phase and a liquid phase, contacting said gaseous phase and an organic compound with a metal halide catalyst of the Friedel-Crafts type under conversion conditions to react at least a portion of the impurities with said organic compound, separating from the resulting products a purified hydrogen halide fraction, and blending the purified hydrogen halide fraction with said liquid phase to form a final hydrogen halide fraction of high purity.

3. A process for purifying a hydrogen chloride fraction containing not more than 10% carbon oxide impurities, which comprises partially liquefying said fraction to separate the same into a gaseous phase and a liquid phase, the gaseous phase comprising not more than 15% of said fraction, reacting said gaseous phase with a saturated hydrocarbon in the presence of a metal halide catalyst of the Friedel-Crafts type under conversion conditions to react at least a portion of said impurities with said saturated hydrocarbon, separating from the resultant products a purified hydrogen chloride fraction, and blending the purified hydrogen chloride fraction with said liquid phase.

4. The process of claim 2 further characterized in that the purified hydrogen halide is separated by fractional distillation.

5. The process of claim 2 further characterized in that said purified hydrogen halide is separated by selective adsorption on a solid adsorbent and then is recovered by desorption.

6. A process for removing carbon oxide impurities from a hydrogen chloride fraction containing the same, which comprises partially liquefying said fraction to separate the same into a gaseous phase and a liquid phase, the gaseous phase comprising not more than 15% of said fraction, reacting said gaseous phase with a paraffinic hydrocarbon in the presence of an aluminum chloride catalyst under conversion conditions to react at least a portion of said impurities with said paraffinic hydrocarbon, fractionating the resultant product to separate a purified hydrogen chloride fraction and blending the purified hydrogen chloride fraction with said liquid phase.

7. A process for removing carbon oxide impurities from a hydrogen chloride fraction containing the same, which comprises partially liquefying said fraction to condense at least 85% of said fraction and to leave uncondensed not more than 15% of said fraction, withdrawing said uncondensed portion and reacting the same with a paraffinic hydrocarbon in the presence of an aluminum chloride catalyst under conversion conditions to react the impurities contained in said uncondensed portion with said paraffinic hydrocarbon, fractionating the resultant products to separate a purified hydrogen chloride fraction, and blending the purified hydrogen chloride fraction with the condensed portion of said fraction.

8. A process for removing carbon oxide impurities from a hydrogen chloride fraction containing the same, which comprises partially liquefying said fraction to condense at least 85% of said fraction and to leave uncondensed not more than 15% of said fraction, withdrawing said uncondensed portion and reacting the same with a paraffinic hydrocarbon in excess of that required for the reaction in the presence of an aluminum chloride catalyst under conversion conditions to react the impurities contained in said uncondensed portion with said paraffinic hydrocarbon, contacting the resultant products with a suitable adsorbent under conditions to selectively adsorb the hydrogen chloride and to thereby separate it from excess paraffinic hydrocarbon, subsequently recovering the hydrogen chloride from the adsorbent by desorption thereof, and blending the thus recovered hydrogen chloride with the condensed portion of said fraction.

9. A process for purifying a hydrogen halide gas containing a carbon oxide impurity, which comprises liquefying the major portion of said gas and separating the remaining gaseous phase from the liquid phase, contacting said gaseous phase with an organic compound and a metal halide catalyst of the Friedel-Crafts type under reaction conditions to react at least a portion of the carbon oxide impurity with said organic compound, and separating purified hydrogen halide from the resultant reaction products.

10. A process for purifying a hydrogen chloride gas containing a carbon oxide impurity, which comprises liquefying the major portion of said gas and separating the remaining gaseous phase from the liquid phase, contacting said gaseous phase with an organic compound and aluminum chloride under reaction conditions to react at least a portion of the carbon oxide impurity with said organic compound, and separating purified hydrogen chloride from the resultant reaction products.

11. The process as defined in claim 9 further characterized in that said organic compound is a paraffinic hydrocarbon.

12. The process as defined in claim 10 further characterized in that said organic compound is a paraffinic hydrocarbon.

HERMAN PINES.
HERMAN S. BLOCH.